(12) United States Patent
Wilson

(10) Patent No.: US 11,325,713 B2
(45) Date of Patent: May 10, 2022

(54) AIRCRAFT ICE PROTECTION SYSTEM AND METHOD

(71) Applicant: SHORT BROTHERS PLC, Belfast (GB)

(72) Inventor: Robert Samuel Wilson, Belfast (GB)

(73) Assignee: SHORT BROTHERS PLC, Belfast (GB)

( * ) Notice: Subject to any disclaimer, the term of this patent is extended or adjusted under 35 U.S.C. 154(b) by 231 days.

(21) Appl. No.: 16/618,663

(22) PCT Filed: Jun. 4, 2018

(86) PCT No.: PCT/EP2018/064627
§ 371 (c)(1),
(2) Date: Dec. 2, 2019

(87) PCT Pub. No.: WO2018/224440
PCT Pub. Date: Dec. 13, 2018

(65) Prior Publication Data
US 2020/0164990 A1 May 28, 2020

(30) Foreign Application Priority Data
Jun. 8, 2017 (GB) .................................... 1709170

(51) Int. Cl.
*B64D 15/12* (2006.01)
*B64D 15/00* (2006.01)
*B64D 15/20* (2006.01)
*B64D 33/02* (2006.01)

(52) U.S. Cl.
CPC ............ *B64D 15/12* (2013.01); *B64D 15/00* (2013.01); *B64D 15/20* (2013.01); *B64D 2033/0233* (2013.01)

(58) Field of Classification Search
CPC ........ B64D 15/12; B64D 15/20; B64D 15/00; B64D 2033/0233
See application file for complete search history.

(56) References Cited

U.S. PATENT DOCUMENTS

| 2,317,019 | A | | 4/1943 | Altemus | |
|---|---|---|---|---|---|
| 2,681,409 | A | | 6/1954 | Dobbins | |
| 4,808,238 | A | * | 2/1989 | Koerner | .................. C09D 9/00 134/38 |
| 5,615,849 | A | | 4/1997 | Salisbury | |

(Continued)

FOREIGN PATENT DOCUMENTS

| EP | 2248692 B1 | 3/2013 |
|---|---|---|
| FR | 920828 A | 4/1947 |

OTHER PUBLICATIONS

United Kingdom Search Report dated Nov. 21, 2017, Kingdom Patent Application No. GB1709170.3.

(Continued)

*Primary Examiner* — Rodney A Bonnette
(74) *Attorney, Agent, or Firm* — Hovey Williams LLP

(57) ABSTRACT

Ice protection systems of aircraft and related methods are disclosed. In one embodiment of the present invention, the system includes a gas-discharge lamp and an electric power source. The gas-discharge lamp is configured to emit infrared radiation toward an inner surface of an aircraft skin. The electric power source is operatively connected to the gas-discharge lamp.

19 Claims, 13 Drawing Sheets

(56) References Cited

U.S. PATENT DOCUMENTS

| | | | |
|---|---|---|---|
| 5,878,952 A * | 3/1999 | Powell | B25J 19/0075 239/1 |
| 6,206,325 B1 | 3/2001 | Nunnally | |
| 8,997,451 B2 | 4/2015 | Dufresne de Virel et al. | |
| 2001/0042820 A1 * | 11/2001 | Wilson | E05F 15/43 250/221 |
| 2004/0246610 A1 * | 12/2004 | Tsuno | G02B 7/183 359/883 |
| 2009/0075214 A1 | 3/2009 | Hirakata et al. | |
| 2011/0036950 A1 | 2/2011 | Guillermond et al. | |
| 2011/0067726 A1 | 3/2011 | Cochran et al. | |
| 2013/0210602 A1 * | 8/2013 | Nonaka | C03C 3/087 501/35 |
| 2013/0327756 A1 * | 12/2013 | Clemen, Jr | B64D 15/20 219/202 |

OTHER PUBLICATIONS

International Search Report and Written Opinion dated Jul. 27, 2018, for International Patent Application No. PCT/EP2018/064627.

\* cited by examiner

AIRCRAFT ICE PROTECTION SYSTEM AND METHOD

CROSS-REFERENCE TO RELATED APPLICATIONS

This is a National Stage Entry into the United States Patent and Trademark Office from International PCT Patent Application No. PCT/EP2018/064627, having an international filing date of Jun. 4, 2018, and which claims priority to United Kingdom Patent Application No. GB1709170.3, filed on Jun. 8, 2017, the entire contents of both of which are incorporated herein by reference.

FIELD OF THE INVENTION

The present disclosure relates generally to ice protection for aircraft, and more particularly, but not exclusively, to the use of radiant heat to provide ice protection for aircraft.

BACKGROUND OF THE INVENTION

It is known that an accumulation of ice on a leading edge of an aircraft wing during flight is undesirable. In traditional ice protection systems for aircraft, hot bleed air is extracted from an engine of the aircraft and routed to areas of the leading edge to remove such accumulation of ice (i.e., de-icing), or, to prevent such accumulation of ice in the first place (i.e., anti-icing). For each wing, one valve controls the flow of the bleed air to the wing leading edge, while a "piccolo" duct distributes the hot bleed air heat along the protected region of the wing leading edge. In cases where ice protection on leading edge slats is required, a telescoping duct is used to supply hot bleed air to the slats and accommodate the deployment and retraction of the slats. After being used to heat the leading edge, the bleed air is then exhausted via holes usually in the lower surface of the wing or slat. The use of hot bleed air for ice protection can result in excess heat and hence energy being carried by the bleed air that is exhausted.

SUMMARY OF THE INVENTION

Aspects of the invention provide a system, a method and an aircraft as claimed in the appended claims.

In one aspect, there is provided an ice protection system for an aircraft having a skin comprising an outer surface exposed to a flow of ambient air during operation of the aircraft, and an opposite inner surface. The system may comprise a gas-discharge lamp configured to emit infrared radiation toward the inner surface of the skin, and an electric power source operatively connected to the gas-discharge lamp.

According to another aspect, there is provided an ice protection system of an aircraft, the system comprising:

a skin of the aircraft, the skin having an outer surface exposed to a flow of ambient air during operation of the aircraft, and an opposite inner surface;

a gas-discharge lamp configured to emit infrared radiation toward the inner surface of the skin; and an electric power source operatively connected to the gas-discharge lamp.

The gas-discharge lamp may be a xenon gas-discharge lamp.

The gas-discharge lamp may be a krypton gas-discharge lamp.

The system may comprise:

a sensor configured to generate a feedback signal representative of a temperature of the skin; and a controller operatively connected to the gas-discharge lamp and to the sensor, the controller being configured to control the gas-discharge lamp based on the feedback signal from the sensor.

The sensor may comprise a pyrometer configured to generate a feedback signal representative of a temperature of the inner surface of the skin.

The pyrometer may be thermally conductively coupled to the skin.

The controller may be configured to cause a pulsed activation of the gas-discharge lamp.

The system may comprise a lamp reflector configured to direct at least some of the infrared radiation emitted by the gas-discharge lamp toward the inner surface of the skin.

The gas-discharge lamp may be configured to emit infrared radiation toward a surface of a structural member of the aircraft where the surface of the structural member is more reflective of the infrared radiation than the inner surface of the skin.

The inner surface of the skin may be black in color.

The inner surface of the skin may have a matte finish.

The inner surface of the skin may comprise paint.

The inner surface of the skin may comprise an anodic coating.

The surface of the structural member may comprise a polished metal.

The surface of the structural member may comprise a mirror finish.

The structural member may support part of the skin.

The structural member may comprise a spar, a stiffener or a bulkhead.

The skin may comprise a fibre-reinforced composite material.

In some embodiments, at least some of the infrared radiation emitted by the gas-discharge lamp has a wavelength within a range of about 3.8 µm to about 4.3 µm.

In some embodiments, at least some of the infrared radiation emitted by the gas-discharge lamp has a wavelength within a mid-infrared range.

In some embodiments, at least some of the infrared radiation emitted by the gas-discharge lamp has a wavelength within a near-infrared range.

The system may comprise a light guide configured to direct at least some of the infrared radiation emitted by the gas-discharge lamp toward the inner surface of the skin.

The system may comprise two or more gas-discharge lamps configured to emit infrared radiation toward a common portion of the inner surface of the skin.

The system may comprise two or more gas-discharge lamps configured to emit infrared radiation toward different portions of the inner surface of the skin. The two or more gas-discharge lamps may be configured to be activated separately.

The gas-discharge lamp may be thermally conductively coupled to the skin.

The skin may comprise an acoustic liner and the gas-discharge lamp may be configured to emit infrared radiation toward a backing sheet of the acoustic liner.

Embodiments may include combinations of the above features.

In another aspect, the disclosure describes a method of providing ice protection to an aircraft skin having an outer surface exposed to a flow of ambient air during operation of the aircraft. The method comprises:

using a gas-discharge lamp to emit infrared radiation toward an inner surface of the skin opposite the outer surface of the skin to heat the inner surface of the skin; and conducting heat through a thickness of the skin toward the outer surface of the skin.

The method may comprise:

sensing a temperature of the skin; and controlling the gas-discharge lamp based on the sensed temperature of the skin.

The sensed temperature of the skin may be a temperature of the inner surface of the skin.

Controlling the gas-discharge lamp may comprise causing a pulsed activation of the gas-discharge lamp.

The method may comprise:

using the gas-discharge lamp to emit infrared radiation toward a surface of a structural member of the aircraft where the surface of the structural member is more reflective of the infrared radiation than the inner surface of the skin; and directing at least some of the infrared radiation reflected off of the surface of the structural member toward the inner surface of the skin.

In some embodiments, at least some of the infrared radiation emitted by the gas-discharge lamp has a wavelength within the range of about 3.8 µm to about 4.3 µm.

In some embodiments, at least some of the infrared radiation emitted by the gas-discharge lamp has a wavelength within a mid-infrared range.

In some embodiments, at least some of the infrared radiation emitted by the gas-discharge lamp has a wavelength within a near-infrared range.

The method may comprise using two or more gas-discharge lamps to emit infrared radiation toward a common portion of the inner surface of the skin.

The method may comprise using two or more gas-discharge lamps to emit infrared radiation toward different portions of the inner surface of the skin.

The method may comprise activating the two or more gas-discharge lamps separately.

The method may comprise activating the two or more gas-discharge lamps sequentially.

The method may comprise cooling the gas-discharge lamp by conducting heat from the gas-discharge lamp to the skin.

The skin may comprise an acoustic liner and the method may comprise using the gas-discharge lamp to emit infrared radiation toward a backing sheet of the acoustic liner to heat the backing sheet.

Embodiments may include combinations of the above features.

In a further aspect, the disclosure describes an ice protection system of an aircraft. The system comprises:

a skin of the aircraft, the skin having an outer surface exposed to a flow of ambient air during operation of the aircraft, and an opposite inner surface;

a structural member of the aircraft, the structural member including a surface that is more reflective of infrared radiation than the inner surface of the skin;

a gas-discharge lamp configured to emit infrared radiation toward the inner surface of the skin and toward the surface of the structural member of the aircraft; and an electric power source operatively connected to the gas-discharge lamp.

The inner surface of the skin may be black in color.

The inner surface of the skin may have a matte finish.

The inner surface of the skin may comprise paint.

The inner surface of the skin may comprise an anodic coating.

The surface of the structural member may comprise a polished metal.

The surface of the structural member may comprise a mirror finish.

The structural member may support part of the skin.

The structural member may comprise a spar, a stiffener or a bulkhead.

The skin may comprise a fibre-reinforced composite material.

The IR lamp may be a gas-discharge lamp.

Embodiments may include combinations of the above features.

In a further aspect, the disclosure describes a method of providing ice protection to an aircraft skin having an outer surface exposed to a flow of ambient air during operation of the aircraft. The method comprises:

emitting infrared radiation toward an inner surface of the skin opposite the outer surface of the skin to heat the inner surface of the skin, and also toward a surface of a structural member of the aircraft other than the skin;

reflecting at least some of the infrared radiation off of the surface of the structural member;

directing the reflected infrared radiation toward the inner surface of the skin; and conducting heat through a thickness of the skin toward the outer surface of the skin.

The method may comprise supporting the skin using the structural member.

The surface of the structural member may be more reflective of the infrared radiation than the inner surface of the skin.

Embodiments may include combinations of the above features.

In another aspect, the disclosure describes an aircraft comprising a system as disclosed herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

Further details of these and other aspects of the subject matter of this application will be apparent from the detailed description included below and the drawings.

DESCRIPTION OF THE DRAWINGS

Embodiments of the invention will now be described, by way of example only, with reference to the accompanying drawings, in which.

DETAILED DESCRIPTION

The present disclosure discloses systems and methods for ice protection (e.g., anti-icing and/or de-icing) of aircraft. In some embodiments, such systems may use a source of infrared (IR) electromagnetic radiation for heating a skin of the aircraft to provide ice protection. The source of IR radiation may be disposed and configured so that the IR radiation may be directed toward an inner surface of the aircraft skin in order to heat the inner surface of the aircraft skin by radiant heating. The heat may then be conducted though a thickness of the aircraft skin toward an outer surface of the aircraft skin in order to heat the outer surface of the aircraft skin and thereby provide ice protection.

In some embodiments, the use of a source of IR radiation may provide advantages including improvements in efficiency, reliability and/or cost effectiveness in comparison with traditional ice protection systems that use hot bleed air from the engines. In some embodiments, the use of IR radiation may reduce the need for excess energy being carried by the bleed air that is exhausted in traditional systems for example. In some embodiments, the use of IR radiation may reduce or eliminate the need for bleed air and its associated discharge holes formed in the lower surface of the wings and may consequently result in a reduction in drag and/or noise normally associated with such holes. Avoiding the use of bleed air from the engines may improve fuel efficiency of the engines. In some embodiments, the use of IR radiation may provide some weight reduction compared to a typical bleed air ice protection system by eliminating the need for ducting, valves, heat exchangers and other equipment associated with typical bleed air ice protection systems. In some embodiments, the use of IR radiation may eliminate some design considerations (e.g., burst duct containment, temperature, sliding duct joints and thermal expansion) associated with typical bleed air ice protection systems.

Aspects of various embodiments are described through reference to the drawings. The figures described herein make reference to different embodiments containing different features however it is understood that some embodiments of system 24 can include features from different figures in various combinations. The present disclosure is intended to encompass such combinations.

Figure 1:
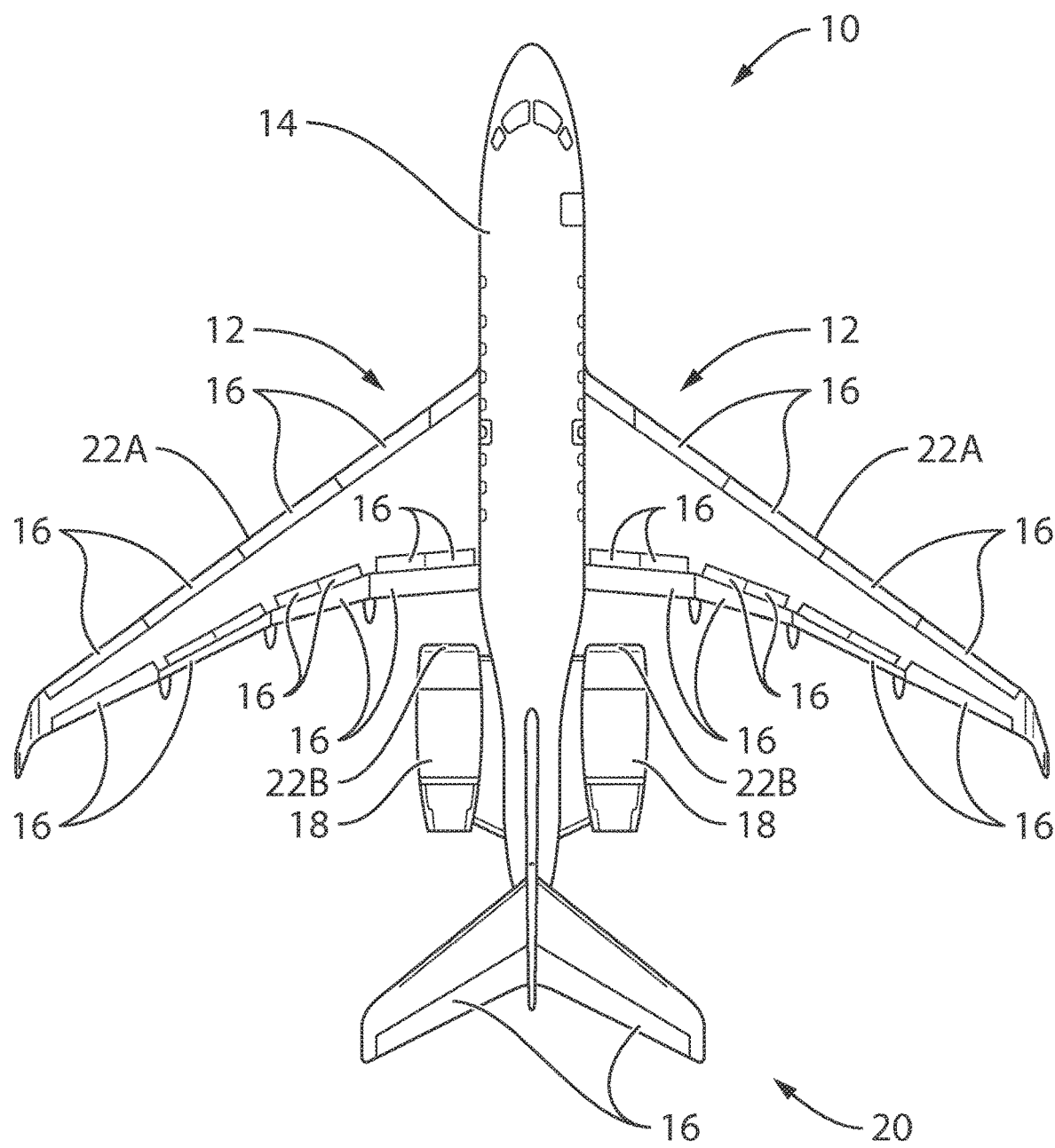
FIG. 1 is a top plan view of an aircraft comprising an ice protection system as disclosed herein.

FIG. 1 is a top plan view of an example aircraft 10 which may comprise an ice protection system as disclosed herein. Aircraft 10 may, for example, be any type of aircraft such as corporate (e.g., business jet), private, commercial and passenger aircraft suitable for civil aviation. For example, aircraft 10 may be a long-range business jet or may be a narrow-body twin engine jet airliner. Aircraft 10 may be a fixed-wing aircraft but it is understood that aspects disclosed herein may also apply to rotary-wing aircraft.

Aircraft 10 may comprise wings 12 and fuselage 14. Aircraft 10 may comprise flight control surfaces 16 (e.g., flaps, slats, ailerons, spoilers, elevator(s), rudder(s)), one or more engines 18 and empennage 20. One or more of flight control surfaces 16 may be mounted to wings 12. One or more of engines 18 may be mounted to fuselage 14. Alternatively, or in addition, one or more of engines 18 may be mounted to wings 12.

Aircraft 10 may comprise leading edge skin 22A and engine inlet lip skin 22B. Leading edge skin 22A may be part of a slat 16 of wing 12 or may be part of a fixed leading edge of wing 12. Engine inlet lip skin 22B may be part of an inlet lip of a nacelle of engine 18. Leading edge skin 22A and engine inlet lip skin 22B are referred generally herein as "skin 22". Aspects disclosed herein are applicable to other skins 22 of aircraft 10 which may benefit from ice protection.

Figure 2:
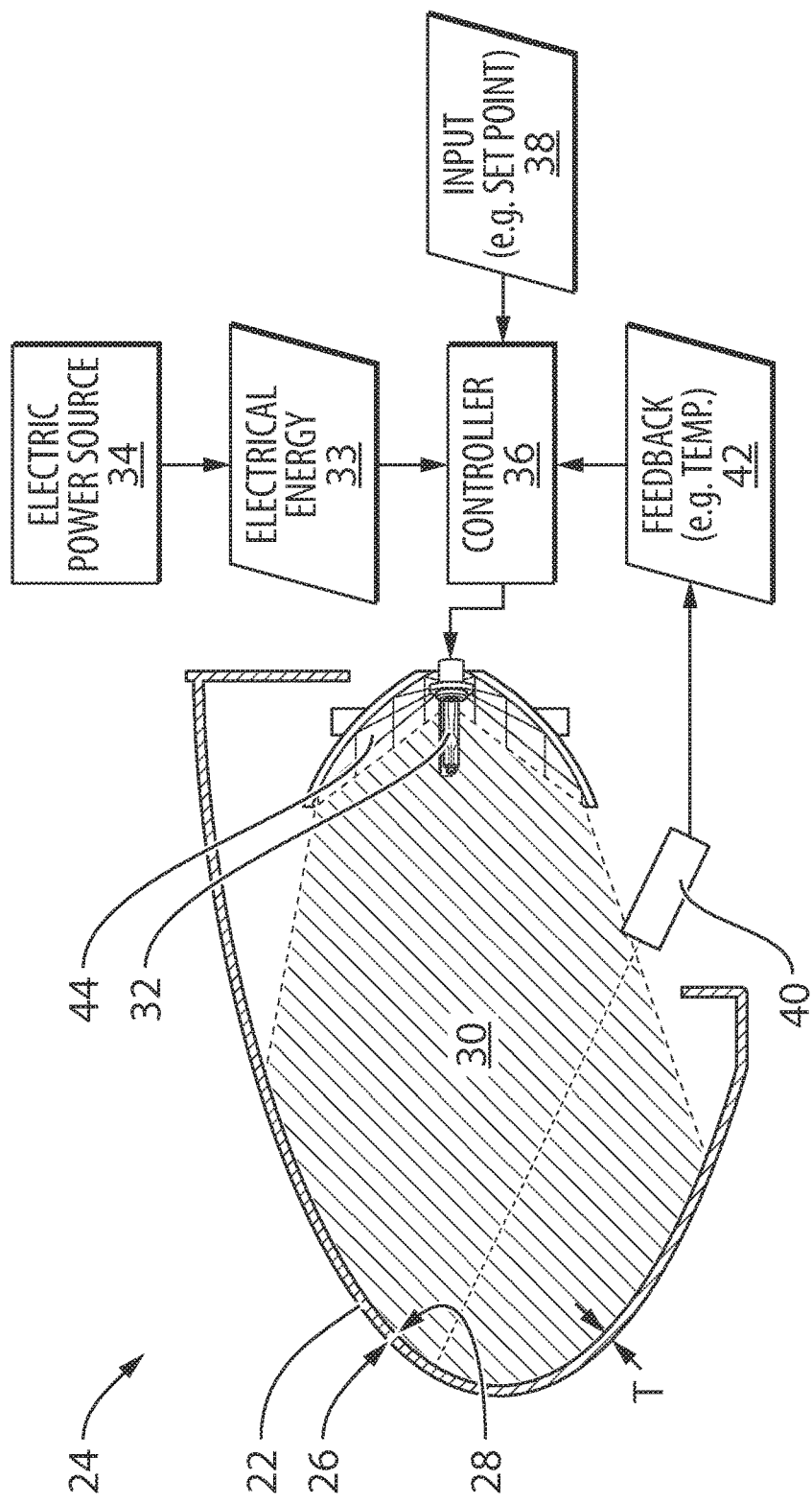
FIG. 2 is a schematic cross-sectional view of an embodiment of an ice protection system of the aircraft of FIG. 1.

FIG. 2 is a schematic view of an example ice protection system 24 of aircraft 10. In various embodiments, system 24 may comprise skin 22 having outer surface 26 exposed to a flow of ambient air during operation (e.g., flight) of aircraft 10. For example, outer surface 26 may be referred to as an "air wet" surface. Outer surface 26 of skin 22 may be an aerodynamic surface that interacts with an air flow and which may be prone to ice accumulation in some atmospheric conditions during flight of aircraft 10 for example. Skin 22 may have inner surface 28 opposite of outer surface 26. Skin 22 may have a thickness T separating outer surface 26 and inner surface 28. Inner surface 28 may partially define inner cavity 30 disposed inside of a body of aircraft 10 comprising skin 22. For example, inner cavity 30 may be disposed inside the leading edge of wing 12 or inner cavity 30 may be disposed inside the engine inlet lip. In some embodiments, inner cavity 30 and its contents may be at least partially shielded from direct impingement of the air flow interacting with skin 22. Inner cavity 30 may nevertheless be in fluid communication with the ambient air in some embodiments.

Skin 22 may define a cover for internal structural or other components of wing 12 or of engine 18 for example. In various embodiments, skin 22 may comprise a suitable metallic material such as an aluminum-based alloy or may comprise a suitable composite material such as a fiber-reinforced polymer for example. In some embodiments, skin 22 may comprise a carbon-fiber-reinforced polymer (CFRP). CFRPs are composite materials that can comprise a matrix (e.g., polymer resin such as epoxy) and a reinforcement (e.g., carbon fibers) embedded in the matrix material and which provides strength.

System 24 may comprise one or more IR lamps 32, such as one or more electrical gas-discharge lamps for example, configured to emit IR radiation toward inner surface 28 of skin 22. IR lamp 32 may be in direct or indirect optical communication with inner surface 28 of skin 22. In some embodiments, IR lamp 32 may be disposed inside inner cavity 30. The term "IR lamp" is intended to encompass any device which emits some IR radiation and that can serve as a source of radiant heat in system 24. In some embodiments, IR lamp 32 may be electrically powered. In some embodiments, system 24 may comprise a plurality of IR lamps 32 as explained below.

It is understood that an entire skin-defining component/sheet or only one or more portions of such skin-defining component/sheet may be provided with ice protection via system 24 depending on the specific application and requirements. In some embodiments, one or more portions of leading edge skin 22A may be provided with ice protection by system 24. Alternatively or in addition, one or more portions of engine inlet lip skin 22B may similarly be provided with ice protection by system 24. It is to be further understood that, in some embodiments, the aircraft skin does not itself form a component of the ice protection system but is instead a part of the aircraft upon which the ice protection system acts, in use. That is, an ice protection system according to some embodiments may comprise only a gas-discharge lamp configured to emit infrared radiation toward the inner surface of the skin and an electric power source operatively connected to the gas-discharge lamp.

IR lamp 32 may be driven by electrical energy 33 provided by electric power source 34 operatively connected to IR lamp 32. Electric power source 34 may comprise an electric bus of aircraft 10. Electric power source 34 may comprise an electric generator that may be driven by one of engines 18 and/or may comprise one or more batteries onboard aircraft 10.

In various embodiments, the type of IR lamp 32 may be selected to output a desired wavelength or range of wavelengths based on the material of skin 22 and/or on a surface treatment applied to inner surface 28 in order to obtain favorable absorption of the IR radiation by skin 22 and promote efficient heating of skin 22. IR lamp 32 may be a gas-discharge lamp configured to generate electromagnetic radiation by passing an electrical current through an ionized gas (plasma). Typically, gas-discharge lamps use a noble gas such as argon, neon, krypton or xenon or a mixture of these gases. Additional substances, like mercury, sodium, and metal halides, may be integrated in the gas mixture of gas-discharge lamps. It is understood that gas-discharge lamps can produce radiation in a wide range of wavelengths. The wavelength(s) of the radiation emitted by a gas-discharge lamp will depend on the atomic structure of the gas(es). For example, the wavelength of the radiation emitted by a gas-discharge lamp can depend on factors such as the emission spectra of the atoms making up the gas, the pressure of the gas and current density for example.

In various embodiments, IR lamp 32 may be a xenon gas-discharge lamp (e.g., xenon arc lamp or xenon flash lamp), a krypton gas-discharge lamp (e.g., krypton arc lamp or krypton flash lamp), a mercury vapour lamp, a metal halide lamp, a ceramic discharge metal halide lamp or a sodium vapour lamp, for example. In some embodiments, IR lamps 32 of different types may be combined in the same system 24.

In some embodiments, IR lamp 32 may be of the type known as "high-intensity discharge" or (HID) lamp which produces light by means of an electric arc between tungsten electrodes housed inside a translucent or transparent fused quartz or fused alumina arc tube. This tube may be filled with both gas and metal salts. The gas facilitates the arc's initial strike and once the arc is started, the arc heats and evaporates the metal salts to form a plasma. In some embodiments, IR lamp 32 may be a flash lamp suitable for pulsed activation where it may be activated to produce a flash of radiation. In some embodiments, such flash of radiation may have a relatively short duration that is less than one (1) sec (e.g., in the millisecond to microsecond range). In some embodiments, IR lamp 32 may be operated at a desired flash frequency. In some de-icing situations, it may be desirable to activate IR lamp 32 in a manner suitable to thermally shock and consequently cause removal of an accumulation of ice that has formed on outer surface 26 of skin 22.

In various embodiments, IR lamp 32 may be configured so that at least some of the radiation that it emits is within the IR range. It is understood that, depending on the type of IR lamp 32, IR lamp 32 may emit radiation at a plurality of wavelengths and that some of the radiation emitted may be outside of the IR range. In some embodiments, at least some of the IR radiation emitted by IR lamp 32 (e.g., xenon gas-discharge lamp) may have a wavelength within a near-infrared range, which may be suitable for absorption into skins 22 made from metallic materials such as an aluminum-based alloy. For example, IR lamp 32 may be of a type that emits IR radiation within the range of about 0.1 μm to about 1 μm. In some embodiments, at least some of the IR radiation emitted by IR lamp 32 may have a wavelength within a mid-infrared range, which may be suitable for absorption into skins 22 made from fiber-reinforced polymers. For example, IR lamp 32 may be of a type that emits IR radiation within the range of about 3.8 μm to about 4.3 μm. In some embodiments, at least some of the IR radiation emitted by IR lamp 32 may have a wavelength within a far-infrared range. In some embodiments, at least some of the electromagnetic radiation emitted by IR lamp 32 may have a wavelength within a visible light range.

Instead of or in addition to one or more gas-discharge lamps, system 24 may, in some embodiments, include one or more other types of IR lamps 32 such as metal wire element, quartz tube, quartz tungsten elements, light emitting diodes (LEDs), laser-powered lights and carbon heater that may be suitable for heating inner surface 28 of skin 22 in order to provide ice protection. However, the use of gas-discharge lamps may be advantageous over other types of IR lamps in some situations. For example, in some embodiments, gas-discharge lamps may, compared to some other types of IR lamps, have a relatively short response time, a relatively good resistance to vibration, a relatively good serviceability and/or lack a heating element that could break or burn out.

In reference to FIG. 2, system 24 may comprise controller 36 which may, for example, comprise one or more computers, data processors, other suitably programmed or programmable logic circuits and related accessories that control at least some aspect of operation of IR lamp 32. Controller 36 may for example be configured to control an activation of IR lamp 32 based on one or more input signals 38. Input signal 38 may be indicative of instructions to activate ice protection system 24 and consequently activate IR lamp 32. Input signal 38 may be provided by another (e.g., avionic) system of aircraft 10. Input signal 38 may be provided due to an action taken by a pilot of aircraft 10 for example. Alternatively, input signal 38 may be provided automatically following the sensing of ambient conditions that are susceptible to cause icing on outer surface 26 of skin 22. In some embodiments, input signal 38 may be representative of a binary command as to whether or not system 24 is to be ON or OFF. In some embodiments, input signal 38 may be representative of a suitable set point for a temperature of skin 22 to be maintained by system 24 in order to provide suitable ice protection. In some embodiments, such set point may depend on the ambient conditions outside of aircraft 10.

In some embodiments, controller 36 may be configured to cause the pulsed activation of IR lamp 32. For example, controller 36 may be configured to cause IR lamp 32 to emit one or more pulses of IR radiation of desired durations. Controller 36 may be configured to control whether or not electrical energy 33 is delivered to one or more IR lamps 32. In some embodiments, controller 36 may be configured to control a rate at which electrical energy 33 is delivered to one or more IR lamps 32.

In some embodiments, controller 36 may be part of a feedback control loop for providing ice protection using IR lamp 32. For example, system 24 may comprise one or more sensors 40 configured to generate one or more feedback signals 42 representative of one or more temperatures of skin 22. Controller 36 may be operatively connected to IR lamp 32 and to sensor 40. Controller 36 may be configured to control an operation of IR lamp 32 based on feedback signal 42 from sensor 40 in order to maintain a minimum temperature of skin 22 that provides suitable ice protection for example.

In some embodiments, sensor 40 may be a suitable contact or non-contact type of sensor. In some embodiments, sensor 40 may, for example, be a pyrometer configured to generate feedback signal 42 that is representative of a temperature of inner surface 28 of skin 22. In some embodiments, sensor 40 may, for example, be a suitable thermocouple configured to generate feedback signal 42 that is representative of the temperature of inner surface 28 of skin 22. When using the temperature of inner surface 28 as a control parameter within system 24, such temperature of inner surface 28 may be selected based on a pre-determined correlation between the temperature of inner surface 28 and the temperature of outer surface 26 of skin 22 under the applicable environmental conditions. Such correlation may be determined empirically or estimated by suitable modeling and simulation. For example, a pre-determined temperature of inner surface 28 may be selected to achieve a temperature of outer surface 26 that provides suitable anti-icing and/or de-icing performance under the applicable operating and ambient conditions (e.g., air speed, ambient temperature).

Depending on the type of IR lamp(s) 32 used and/or on the configuration of cavity 30, system 24 may comprise a suitable lamp reflector 44 disposed inside cavity 30. Lamp reflector 44 may be configured to direct at least some of the IR radiation emitted by the IR lamp 32 toward inner surface 28 of skin 22. Lamp reflector 44 may comprise a surface that is relatively highly reflective of IR radiation and that is configured and/or oriented to redirect IR radiation toward inner surface 28. Lamp reflector 44 may be secured to a suitable structural member of aircraft 10 and be in a fixed relationship to IR lamp 32. In some embodiments lamp reflector 44 may comprise a parabolic reflective surface (e.g., mirror). It is understood that other types of lamp reflector 44 may also be suitable.

Figure 3:
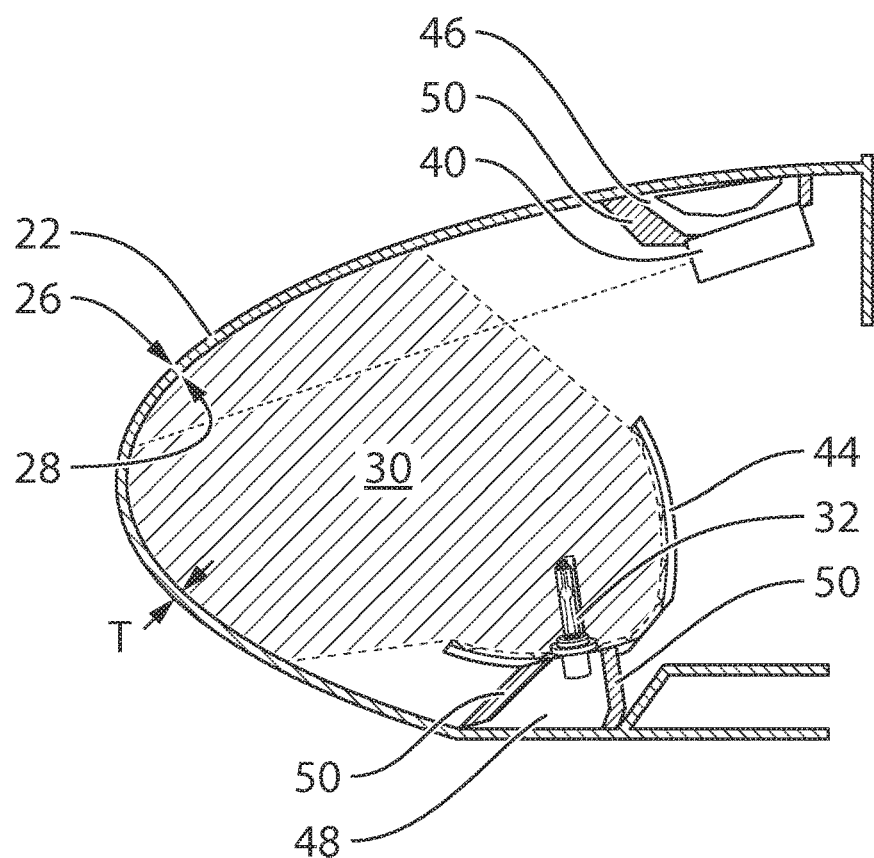
FIG. 3 is a schematic cross-sectional view of part of another embodiment of the ice protection.

FIG. 3 is a schematic cross-sectional view of part of another example embodiment of ice protection system 24 where some components of system 24 shown in FIG. 2 and described above have been omitted for clarity. In some embodiments, it may be desirable to provide cooling to some components of system 24 and this can be achieved in a number of ways. For example, in some embodiments, some components of system 24 may be fluid cooled where a cooling fluid is actively circulated to extract heat from such component(s). For example, exterior/ambient air may be channelled into cavity 30 for example to extract heat from such component(s). Another option may be the use of one or more Peltier devices (i.e., thermoelectric coolers) to extract heat from such component(s) where heat from the hot side(s) of such device(s) could be transferred to skin 22 in order to contribute toward the icing protection provided by system 24.

A further cooling option may be to use conduction to transfer heat from such component(s) to skin 22 for example. Such cooling by conduction may be achieved by having one or more components such as IR lamp 32, lamp reflector 44 and/or sensor 40 (e.g., pyrometer) thermally conductively coupled to skin 22 or to other structure that can serve as a heat sink. In some embodiments, skin 22 and the flow of ambient air flowing against outer surface 26 may serve as a heat sink. For example, in some embodiments, sensor 40 may be physically secured to skin 22 via suitable sensor mount 46 and IR lamp 32 may be physically secured to skin 22 via lamp mount 48. Mounts 46 and 48 may be made from a thermally conductive material such as an aluminum-based alloy to facilitate conductive heat transfer. In some embodiments, one of more of mounts 46, 48 may be thermally insulated from cavity 30 via suitable thermal insulation 50.

Figure 4:
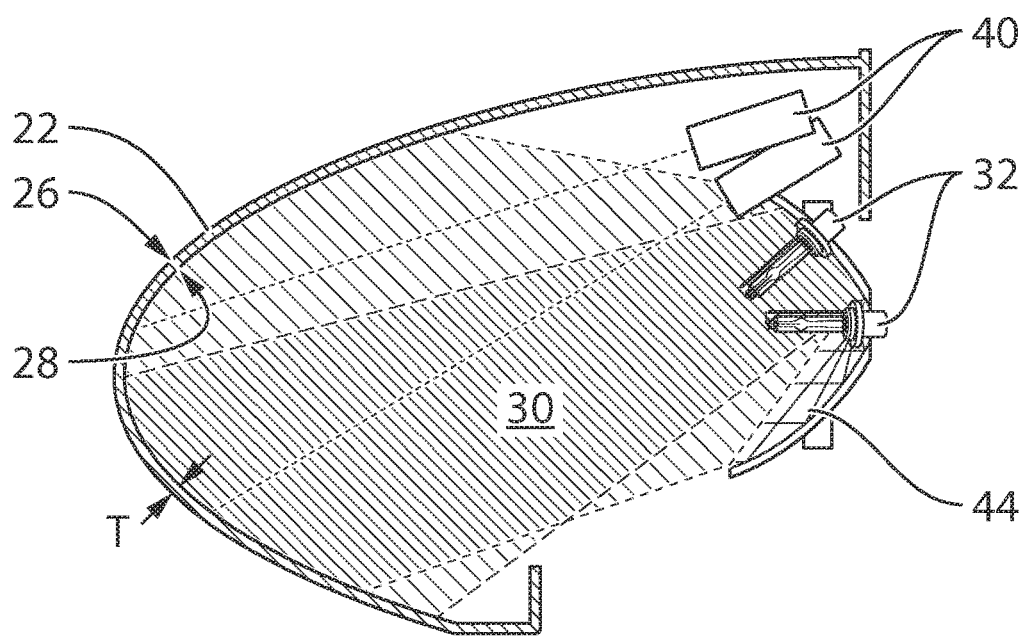
FIG. 4 is a schematic cross-sectional view of part of another embodiment of the ice protection.

FIG. 4 is a schematic cross-sectional view of part of another example embodiment of ice protection system 24 where some components of system 24 shown in FIG. 2 and described above have been omitted for clarity. In some embodiments, it may be desirable for system 24 to have two or more IR lamps 32 configured to emit IR radiation toward a common portion of inner surface 28 of skin 32. The two or more IR lamps 32 may be activated simultaneously or separately depending on the amount of heating desired. The two or more IR lamps 32 may also provide some functional redundancy so that in case of failure of one IR lamp 32, another redundant IR lamp 32 could provide some protection. In some embodiments, the regions illuminated by the two or more IR lamps 32 may substantially coincide so that a common portion of inner surface 28 of skin 32 may be heated by both IR lamps 32. In some embodiments, the regions illuminated by the two or more IR lamps 32 may overlap each other to provide additional heating capacity within the overlapping region.

In some embodiments, it may be desirable for system 24 to have two or more sensors 40 configured to sense the temperature of the same region of skin 22 for functional redundancy. Alternatively or in addition, two or more sensors 40 configured to sense the temperature of different regions of skin 22 to permit the temperatures in different regions of skin 22 to be separately controlled.

Figure 5:
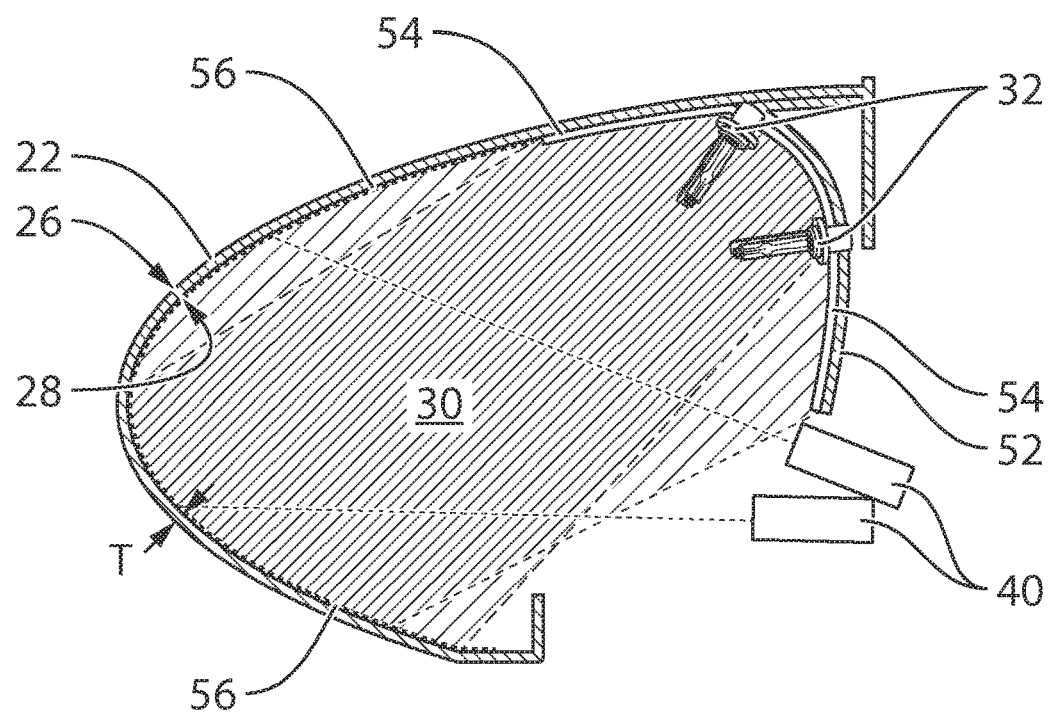
FIG. 5 is a schematic cross-sectional view of part of another embodiment of the ice protection.

FIG. 5 is a schematic cross-sectional view of part of another example embodiment of ice protection system 24 where some components of system 24 shown in FIG. 2 and described above have been omitted for clarity. In some embodiments, one or more surfaces of one or more structural members 52 may be configured to serve as reflectors of IR radiation instead of or in addition to lamp reflector 44 shown in FIGS. 2 and 3. In various embodiments, such structural members 52 may include part of skin 22, a spar, a stiffener and/or a bulkhead for example. In some embodiments, structural member 52 may support part of skin 22 for example. In some embodiments, structural member 52 may be thermally conductively coupled to skin 22 so that heat absorbed by structural member 52 may be conducted to skin 22 and contribute toward providing ice protection. In some embodiments, structural member 52 may define part of inner cavity 30.

In some embodiments, one or more surfaces of such structural members 52 may be provided with suitable reflective surface treatments 54 that are at least partially reflective of IR radiation emitted by IR lamps 32. In some embodiments, such surfaces may be provided with reflective surface treatment 54 that is relatively highly reflective of IR radiation. In some embodiments, reflective surface treatment 54 may comprise a polished metal. In some embodiments, reflective surface treatment 54 may have a mirror finish. In some embodiments, reflective surface treatment 54 may comprise a silvered surface. In some embodiments, reflective surface treatment 54 may be white in color. In some embodiments, a reflective surface of structural member 52 may have a concave shape and may provide some directing and/or focussing of the IR radiation emitted by the one or more IR lamps 32 toward inner surface 28 of skin 22.

In contrast, one or more portions of inner surface 28 of skin 22 where radiant heating is desired may be provided with suitable absorptive surface treatments 56 that are at least partially absorptive of IR radiation emitted by IR lamps 32. In some embodiments, such surfaces may be provided with absorptive surface treatment 56 that is relatively highly absorptive of IR radiation. In various embodiments, absorptive surface treatment 56 may be more absorptive of IR radiation at the desired wavelength(s) or wavelength range than reflective surface treatment 54. In other words, reflective surface treatment 54 may be more reflective of IR radiation at the desired wavelength(s) or wavelength range than absorptive surface treatment 56. In some embodiments, absorptive surface treatment 56 may be black in color. In some embodiments, absorptive surface treatment 56 may have a matte finish. In some embodiments, absorptive surface treatment 56 may comprise paint. In some embodiments, absorptive surface treatment 56 may comprise an anodic coating covering an aluminum-based skin 22 for example.

Figure 6:
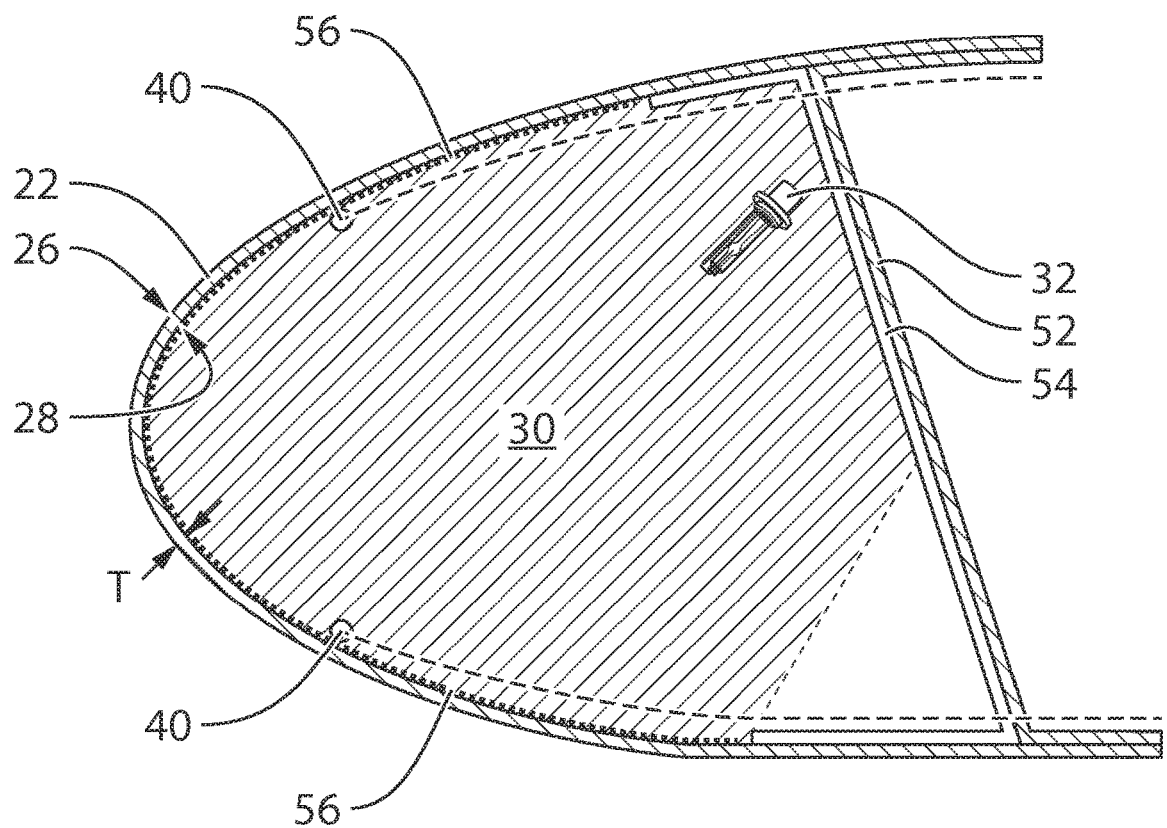
FIG. 6 is a schematic cross-sectional view of part of another embodiment of the ice protection.

FIG. 6 is a schematic cross-sectional view of part of another example embodiment of ice protection system 24 where some components of system 24 shown in FIG. 2 and described above have been omitted for clarity. The embodiment of FIG. 6 shows another example structural member 52 being used as a reflector of IR radiation for directing some of the IR radiation emitted by IR lamp 32 toward inner surface 28 of skin 22. As explained above structural member 52 may comprise reflective surface treatment 54 and inner surface 28 may comprise an absorptive surface treatment 56. Instead of non-contact sensors, the embodiment of FIG. 6 schematically illustrates the use of one or more thermocouples 40.

Figure 7:
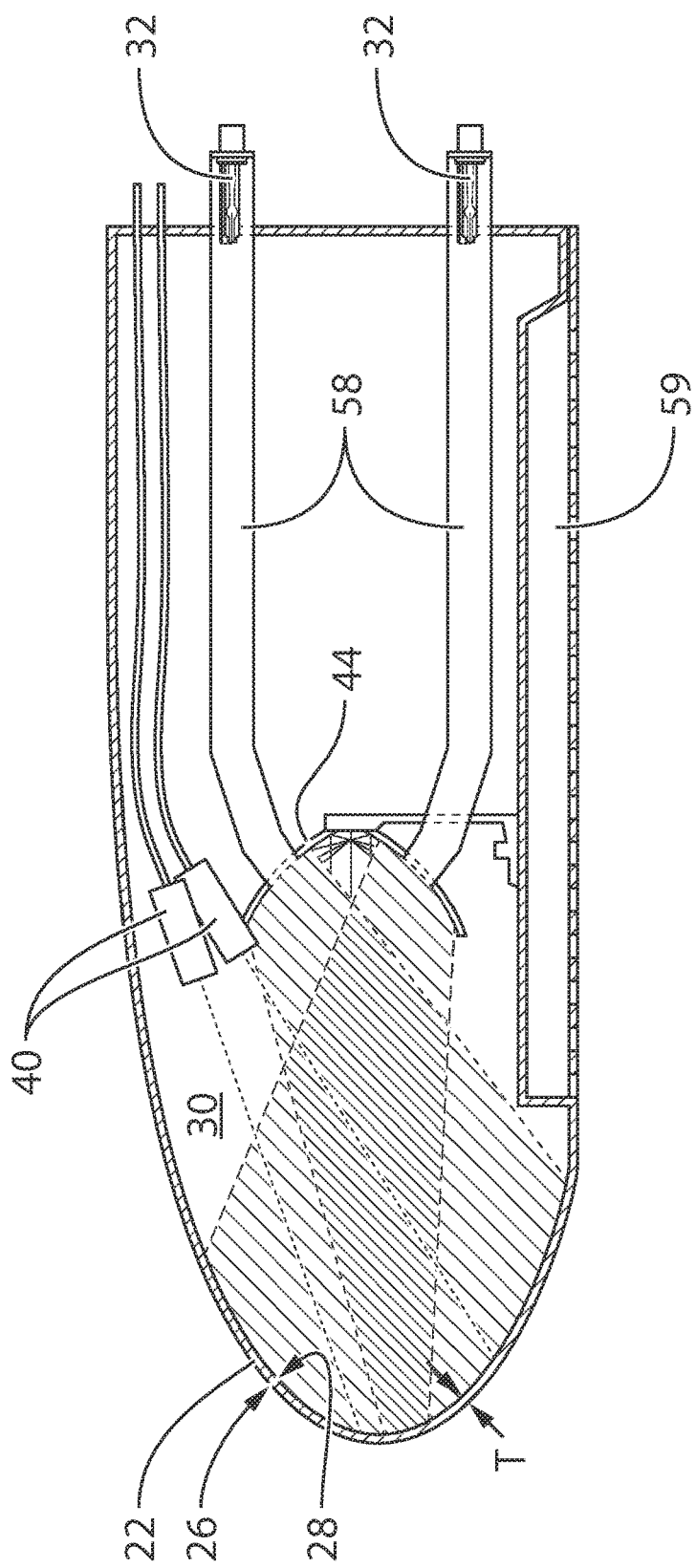
FIG. 7 is a schematic cross-sectional view of part of another embodiment of the ice protection system including light guides for directing the infrared radiation emitted by respective infrared lamps.

FIG. 7 is a schematic cross-sectional view of part of another example embodiment of ice protection system 24 where some components of system 24 shown in FIG. 2 and described above have been omitted for clarity. Depending on installation constraints and accessibility, one or more IR lamps 32 may be indirectly optically coupled to inner surface 28 of skin 22 via suitable respective light guides 58. Light guides 58, sometimes called "light pipes" or "light tubes" may comprise physical structures used for transporting IR radiation emitted by IR lamps 32 for the purpose of permitting the installation of IR lamps 32 at accessible locations convenient for bulb replacement for example. Light guides 58 may serve as optical waveguides for directing the IR radiation from IR lamps 32 toward inner surface 28 of skin 22. For example, light guides 58 may direct the IR radiation from IR lamps 32 to lamp reflector 44. In case of integration of this embodiment with an engine inlet lip, lamp reflector 44 may be mounted adjacent an acoustic liner 59 within the nacelle of engine 18.

Figure 8:
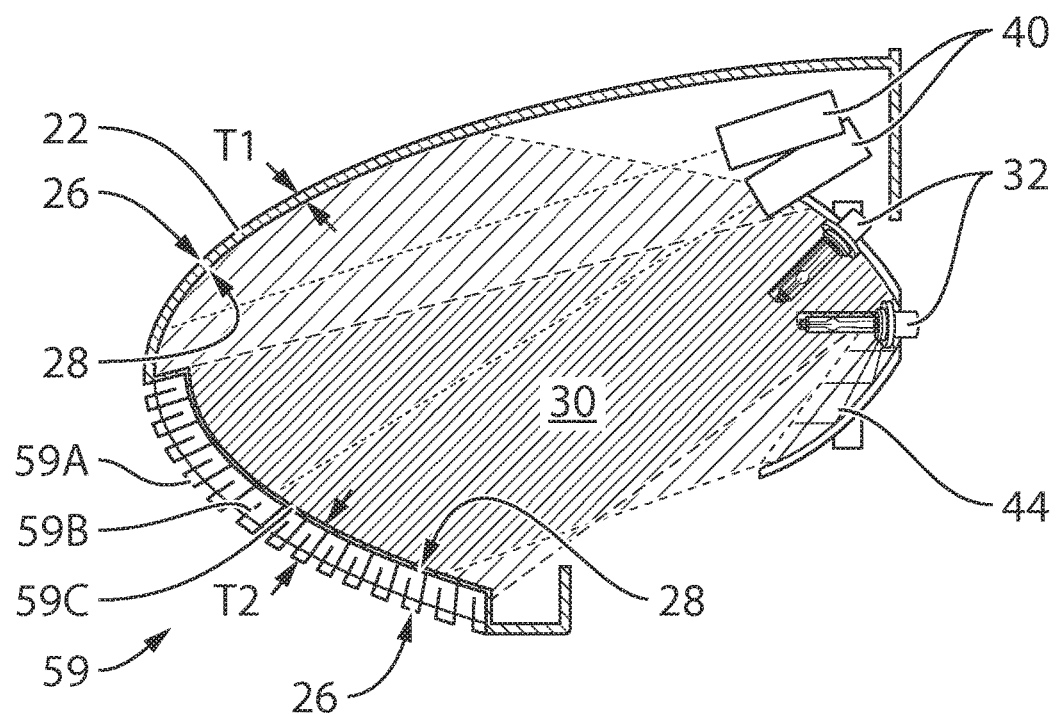
FIG. 8 is a schematic cross-sectional view of part of another embodiment of the ice protection system.

FIG. 8 is a schematic cross-sectional view of part of another example embodiment of ice protection system 24 where some components of system 24 shown in FIG. 2 and described above have been omitted for clarity. In some embodiments such as for an engine inlet lip for example, skin 22B may comprise acoustic liner 59. The region of skin 22 comprising acoustic liner 59 may have a thickness T2 that is greater than a thickness T1 of skin 22 which does not comprise acoustic liner 59. Acoustic liner 59 may comprise a perforated facing sheet 59A, noise-attenuating core 59B (e.g., honeycomb) and backing sheet 59C. Noise attenuating core 59B may be disposed between facing sheet 59A and backing sheet 59C. In some embodiments, facing sheet 59A, core 59B and backing sheet 59C may be made of a suitable aluminum alloy or other material(s) having a relatively good thermal conductivity so that radiant heat absorbed by backing sheet 59C may be conducted to outer surface 26 of facing sheet 59A via core 59B. In some embodiments, core 59B may comprise a hexagon cell honeycomb structure.

Figure 9:
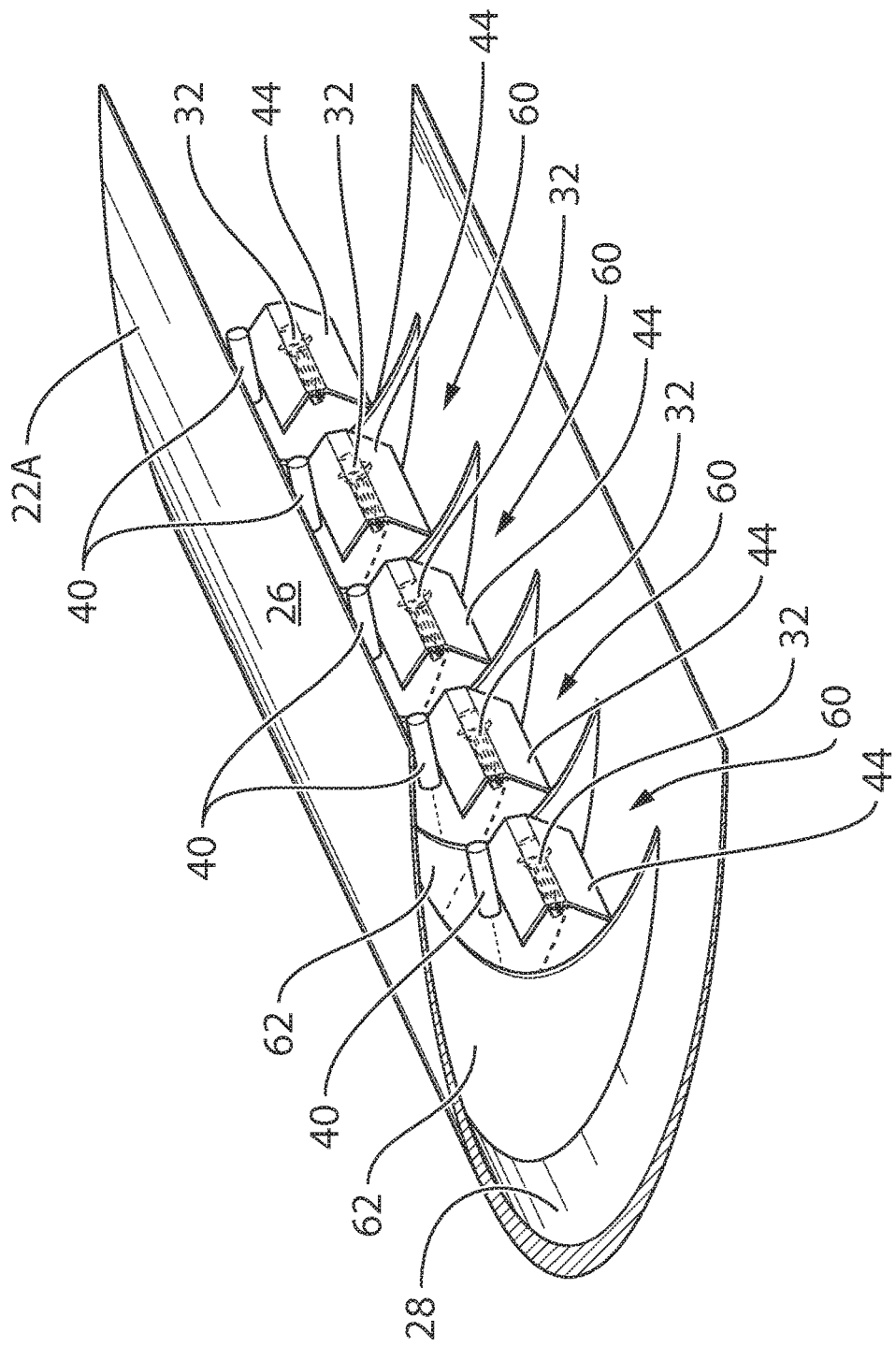
FIG. 9 is a schematic perspective view of the inside of a wing leading edge the aircraft of FIG. 1 showing a layout of a plurality of infrared lamps of the ice protection system.

FIG. 9 is a schematic perspective view of the inside of a wing leading edge of aircraft 10 showing an example layout of a plurality of IR lamps 32 of ice protection system 24 together with associated sensors 40 and lamp reflectors 44 to form separate heating units 60. In some embodiments, two or more of such heating units 60 may be distributed along a length (e.g., span) of leading edge skin 22A of wing 12 to provide suitable heating along the length. For example, a plurality of heating units 60 may be positioned to form one or more linear arrays. Accordingly, IR lamps 32 of such heating units 60 may be configured to emit IR radiation toward different portions of inner surface 28 of skin 22A. In some embodiments, heating units 60 may be disposed between structural ribs 62 that provide localized supports for skin 22A and may improve the bird strike resistance of system 24. It is understood that system 24 may be used to control a plurality of such heating units 60 and that some or each heating unit 60 may comprise one or more IR lamps 32 as explained above.

In some embodiments, controller 36 (see FIG. 2) may be configured to control each IR lamp 32 and cause their simultaneous or separate activation. For example, controller 36 and IR lamps 32 may be configured to permit two or more IR lamps 32 to be activated at the same time or separately at different times. In some embodiments, controller 36 and IR lamps 32 may be configured to permit two or more IR lamps 32 to be activated independently of each other. In some embodiments IR lamps 32 may be activated sequentially for example. In reference to FIG. 8, such sequential operation of heating units 60 in an order of their position may, for example, permit a de-icing operation to be conducted progressively toward an inboard or an outboard direction along wing 12 in order to "unzip" an ice buildup from skin 22A.

Figure 10:
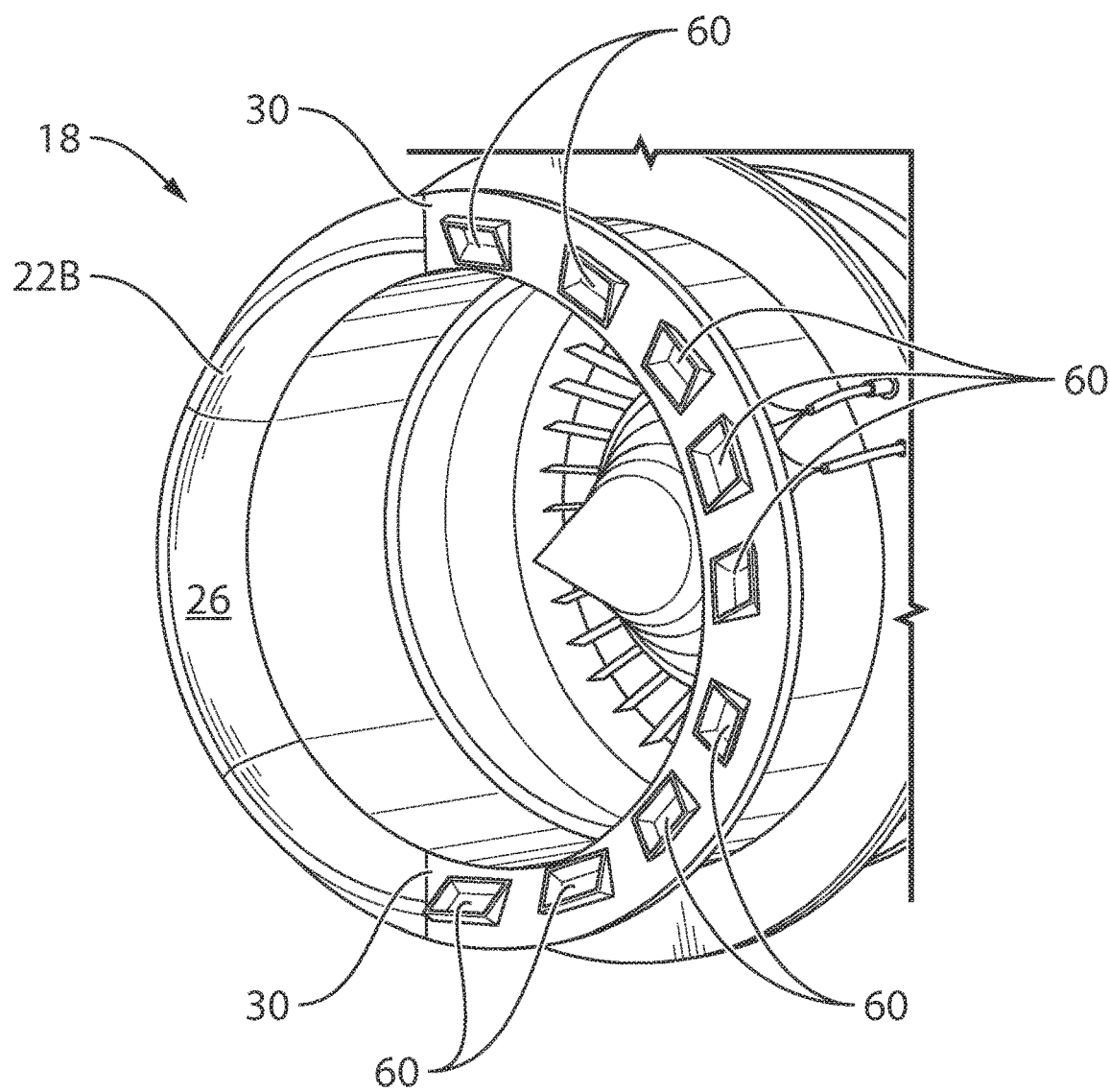
FIG. 10 is a schematic perspective view of an inlet lip of an engine of the aircraft of FIG. 1 showing a layout of a plurality of gas-discharge lamps disposed inside the inlet lip.

FIG. 10 is a schematic perspective view of an inlet lip of engine 18 of aircraft 10 showing an example layout of a plurality heating units 60 disposed inside of the inlet lip. FIG. 9 shows a portion of engine inlet lip skin 22B being cut away to show inner cavity 30 in which heating units 60 may be disposed. Heating units 60 may be circumferentially distributed about the inlet of engine 18 or disposed at any desired circumferential location(s) where ice protection is desired. For example, a plurality of heating units 60 may be positioned to form one or more circular arrays.

Figure 11A:
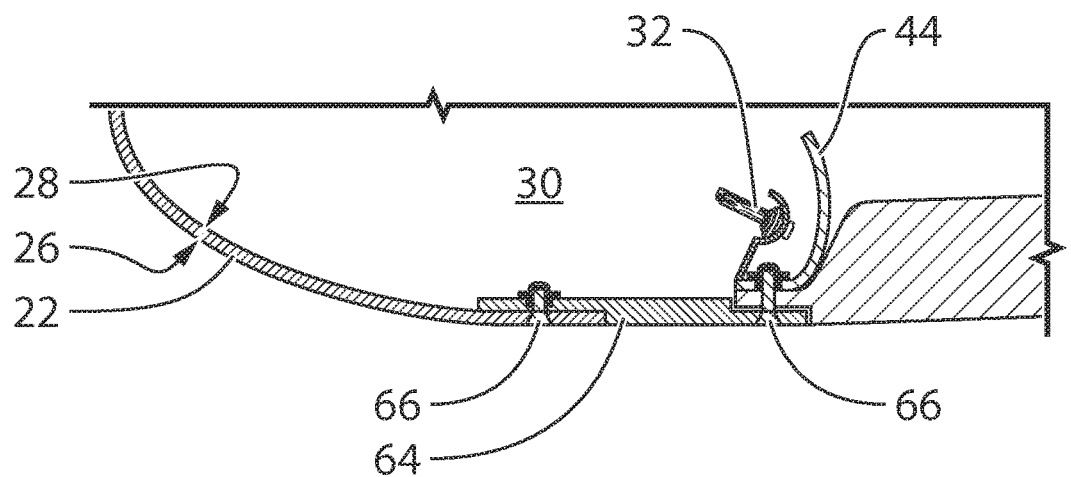
FIGS. 11A and 11B are schematic cross-sectional views illustrating an access panel to facilitate the replacement of the infrared lamp of the ice protection system.
Figure 11B:
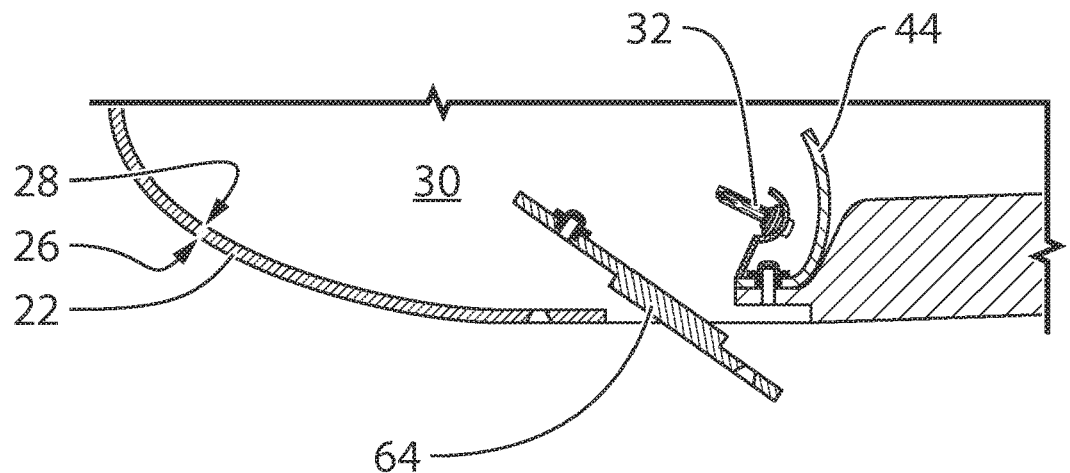

FIGS. 11A and 11B are schematic cross-sectional views illustrating an example access panel 64 to facilitate the replacement of IR lamp 32 of ice protection system 24. In various embodiments, such access panels 64 may be provided in skin 22 or in any other suitable structure to facilitate access to IR lamps 32 by maintenance personnel for bulb replacement or other maintenance. Access panel 64 may be secured via one or more fasteners 66. FIG. 11A shows access panel 64 being secured in place and FIG. 11B shows access panel 64 in the process of being removed where fasteners 66 have been removed.

Figure 12:
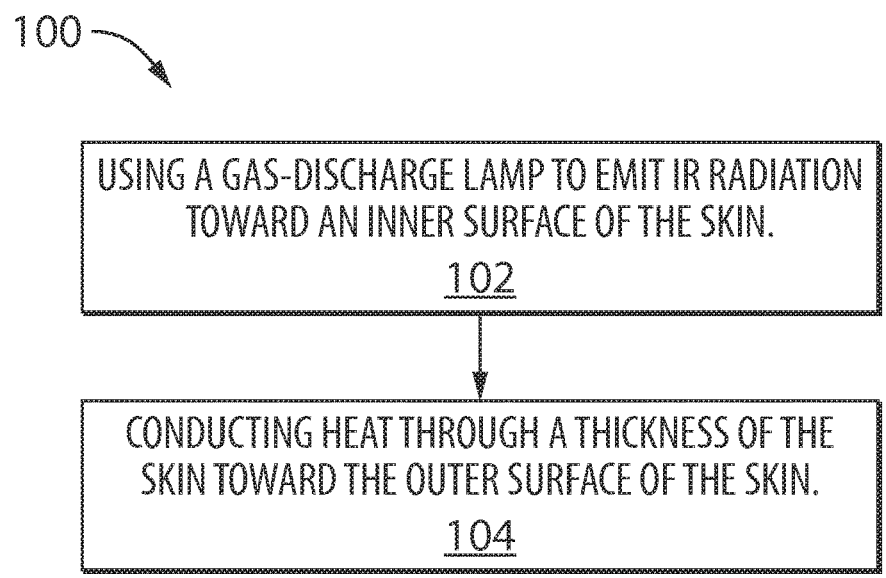
FIG. 12 is a flowchart of a method of providing ice protection for an aircraft skin.

FIG. 12 is a flowchart of an example method 100 of providing ice protection for aircraft skin 22. Method 100 may be conducted using system 24 described above or other suitable systems. Aspects of system 24 or other methods disclosed herein can also apply to method 100. In various embodiments, method 100 can comprise: using IR (e.g., gas-discharge) lamp 32 to emit IR radiation toward inner surface 28 of skin 22 opposite outer surface 26 of skin 22, to heat inner surface 28 of skin 22 (see block 102); and conducting heat through a thickness T of skin 22 toward outer surface 26 of skin 22 (see block 104).

Method 100 may comprise sensing a temperature of skin 22 and controlling IR lamp 32 based on the sensed temperature of skin 22. The sensed temperature of skin 22 may be a temperature of inner surface 28 of skin 22 obtained via sensor 40 for example. Controlling IR lamp 32 may comprise causing a pulsed activation of IR lamp 32.

Method 100 may comprise using IR lamp 32 to emit IR radiation toward a surface of structural member 52 where reflective surface treatment 54 of the surface of structural member 52 is more reflective of the IR radiation than absorptive surface treatment 56 of inner surface 28 of skin 22. Method 100 may also comprise directing at least some of the IR radiation reflected off of the surface of structural member 52 toward inner surface 28 of skin 22.

In some embodiments of method 100, at least some of the infrared radiation emitted by IR lamp 32 has a wavelength within the range of about 3.8 μm to about 4.3 μm. In some embodiments of method 100, at least some of the IR radiation emitted by IR lamp 32 has a wavelength within a mid-infrared range. In some embodiments of method 100, at least some of the IR radiation emitted by IR lamp 32 has a wavelength within a near-infrared range. In some embodiments of method 100, at least some of the IR radiation emitted by IR lamp 32 has a wavelength within a far-infrared range.

Method 100 may comprise using two or more IR lamps 32 to emit IR radiation toward a common portion of inner surface 28 of skin 22. Method 100 may comprise using two or more IR lamps 32 to emit IR radiation toward different portions of inner surface 28 of skin 22. Method 100 may comprise activating the two or more IR lamps 32 separately. Method 100 may comprise activating the two or more IR lamps 32 sequentially based on their respective locations. For example, more than two IR lamps 32 in a row may be activated sequentially in order along the row of IR lamps 32.

In some embodiments where skin 22 comprises acoustic liner 59, method 100 may comprise using IR lamp 32 to emit IR radiation toward backing sheet 59C of acoustic liner 59 to heat backing sheet 59C.

Method 100 may comprise cooling IR lamp 32 by conducting heat from IR lamp 32 to skin 22.

Figure 13:
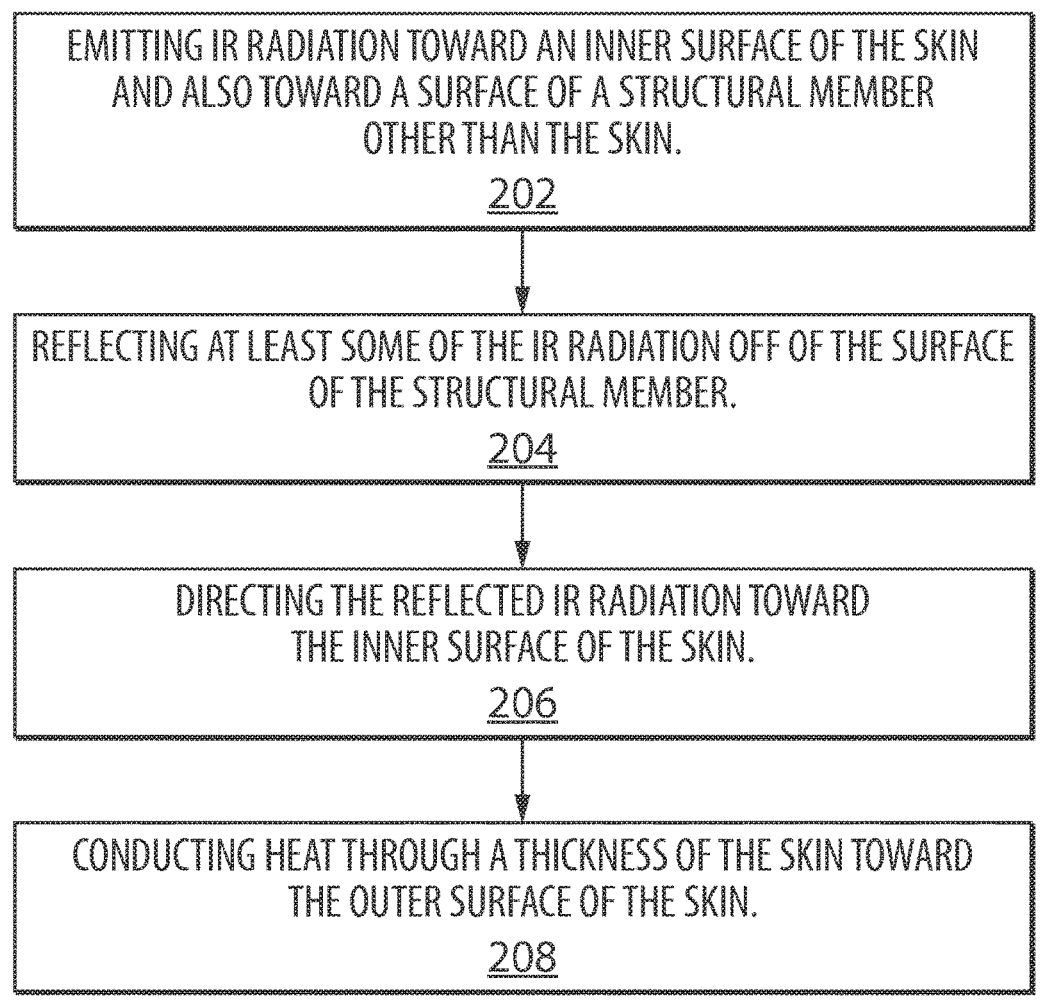
FIG. 13 is a flowchart of another method of providing ice protection for an aircraft skin.

FIG. 13 is a flowchart of another example method 200 of providing ice protection for aircraft skin 22. Method 200 may be conducted using system 24 described above or other suitable systems. Aspects of system 24 or other methods disclosed herein can also apply to method 200. In various embodiments, method 200 can comprise: emitting IR radiation toward inner surface 28 of skin 22 opposite outer surface 26 of skin 22 to heat inner surface 28 of skin 22, and also toward a surface of structural member 52 of aircraft 10 other than skin 22 (see block 202); reflecting at least some of the IR radiation off of the surface of structural member 52 (see block 204); directing the reflected IR radiation toward inner surface 28 of skin 22 (see block 206); and conducting heat through thickness T of skin 22 toward outer surface 26 of skin 22 (see block 208). Reflective surface treatment 54 of the surface of structural member 52 may be more reflective of the IR radiation than absorptive surface treatment 56 of inner surface 28 of skin 22.

Method 200 may comprise supporting skin 22 using structural member 52.

The above description is meant to be by way of example only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

The invention claimed is:

1. An ice protection system for an aircraft, the system comprising:
a skin of the aircraft, the skin having an outer surface exposed to a flow of ambient air during operation of the aircraft, and an opposite inner surface;
an infrared radiation emitter configured to emit infrared radiation toward the inner surface of the skin; and
an electric power source operatively connected to the infrared radiation emitter,
wherein the infrared radiation emitter is configured to emit infrared radiation toward a surface of a structural member of the aircraft where the surface of the structural member is more reflective of the infrared radiation than the inner surface of the skin, and
wherein the structural member supports part of the skin.

2. The system as claimed in claim 1, wherein the infrared radiation emitter is a xenon gas-discharge lamp.

3. The system as claimed in claim 1, wherein the infrared radiation emitter is a krypton gas-discharge lamp.

4. The system as claimed in claim 1, comprising:
a sensor configured to generate a feedback signal representative of a temperature of the skin; and
a controller operatively connected to the infrared radiation emitter and to the sensor, the controller being configured to control the infrared radiation emitter based on the feedback signal from the sensor.

5. The system as claimed in claim 4, wherein the sensor comprises a pyrometer configured to generate a feedback signal representative of a temperature of the inner surface of the skin.

6. The system as claimed in claim 5, wherein the pyrometer is thermally conductively coupled to the skin.

7. The system as claimed in claim 4, wherein the controller is configured to cause a pulsed activation of the infrared radiation emitter, wherein the pulsed activation has a duration of less than one second.

8. The system as claimed in claim 1, comprising a reflector configured to direct at least some of the infrared radiation emitted by the infrared radiation emitter toward the inner surface of the skin.

9. The system as claimed in claim 1, wherein the inner surface of the skin is black in color.

10. The system as claimed in claim 1, wherein the inner surface of the skin has a matte finish.

11. The system as claimed in claim 1, wherein the inner surface of the skin comprises paint.

12. The system as claimed in claim 1, wherein the inner surface of the skin comprises an anodic coating.

13. The system as claimed in claim 1, wherein the surface of the structural member comprises a polished metal.

14. The system as claimed in claim 1, wherein the surface of the structural member comprises a mirror finish.

15. The system as claimed in claim 1, wherein the structural member comprises at least one of a spar, a stiffener, or a bulkhead.

16. The system as claimed in claim 1, wherein the skin comprises a fiber-reinforced composite material.

17. The system as claimed in claim 1, wherein at least some of the infrared radiation emitted by the infrared radiation emitter has a wavelength within a range of 3.8 μm to 4.3 μm.

18. The system as claimed in claim 1, wherein at least some of the infrared radiation emitted by the infrared radiation emitter has a wavelength within a mid-infrared range.

19. The system as claimed in claim 1, wherein at least some of the infrared radiation emitted by the infrared radiation emitter has a wavelength within a near-infrared range.

\* \* \* \* \*